Dec. 24, 1963 H. G. GUILLON 3,115,608

SEQUENTIAL SWITCHING DEVICE

Filed May 8, 1962 7 Sheets-Sheet 1

INVENTOR
HENRI GEORGES GUILLON
BY
William D. Stokes
ATTORNEY

Dec. 24, 1963 H. G. GUILLON 3,115,608

SEQUENTIAL SWITCHING DEVICE

Filed May 8, 1962 7 Sheets-Sheet 2

INVENTOR
HENRI GEORGES GUILLON
BY
William D. Stokes
ATTORNEY

INVENTOR
HENRI GEORGES GUILLON
BY
William D. Stokes
ATTORNEY

INVENTOR
HENRI GEORGES GUILLON
BY
William W. Stokes
ATTORNEY

Dec. 24, 1963 H. G. GUILLON 3,115,608

SEQUENTIAL SWITCHING DEVICE

Filed May 8, 1962 7 Sheets-Sheet 5

INVENTOR

BY William W. Stokes

ATTORNEY

Dec. 24, 1963 H. G. GUILLON 3,115,608

SEQUENTIAL SWITCHING DEVICE

Filed May 8, 1962 7 Sheets-Sheet 6

INVENTOR

BY William D. Stokes

ATTORNEY

Dec. 24, 1963 H. G. GUILLON 3,115,608

SEQUENTIAL SWITCHING DEVICE

Filed May 8, 1962 7 Sheets-Sheet 7

INVENTOR

BY William W Stokes

ATTORNEY

United States Patent Office 3,115,608
Patented Dec. 24, 1963

3,115,608
SEQUENTIAL SWITCHING DEVICE
Henri Georges Guillon, Palaiseau, France, assignor to Commissariat a l'Energie Atomique, Paris, France
Filed May 8, 1962, Ser. No. 193,177
Claims priority, application France May 12, 1961
13 Claims. (Cl. 328—105)

The present invention relates to sequential switching devices, that is to say to devices which, in response to a trigger pulse, undergo a sequence of switchings. It is more especially concerned with switching devices intended to produce, in response to a trigger pulse, a succession of signals available on one or several channels and capable of controlling a sequence of operations.

The chief object of the invention is to provide a commutation device of this kind which is better adapted to meet the requirements of practice than those known at the present time, in particular concerning automation and safety of operation, simplicity of the electronic components and circuits to be used, diversity of the possible applications and embodiments thereof.

According to the main feature of this invention, the sequential switching device comprises, in combination: at least one electronic switch having one input and more than two outputs, this switch having more than two distinct states, in each of which it feeds one of its outputs respectively, and passing, in response to a trigger pulse applied to its input, from one state to the next one while feeding the respective output corresponding to this new state; means for deducing, from the feeding of some of said outputs, output pulses produced by the beginning of these feedings; a mixer having at least two inputs, at least one of which is connected to a control element to receive pulses serving to start switching and at least another one which is connected to said means for receiving said output pulses, and an output connected to the input of said switch for transmitting thereto, as trigger pulses, both the starting pulses received at its first input and the output pulses received at its second input; and at least one delay unit connected so as to delay at least said output pulses.

Preferred embodiments of this invention will be hereinafter described with reference to the accompanying drawings, given merely by way of example, and in which.

Figures 1, 2:
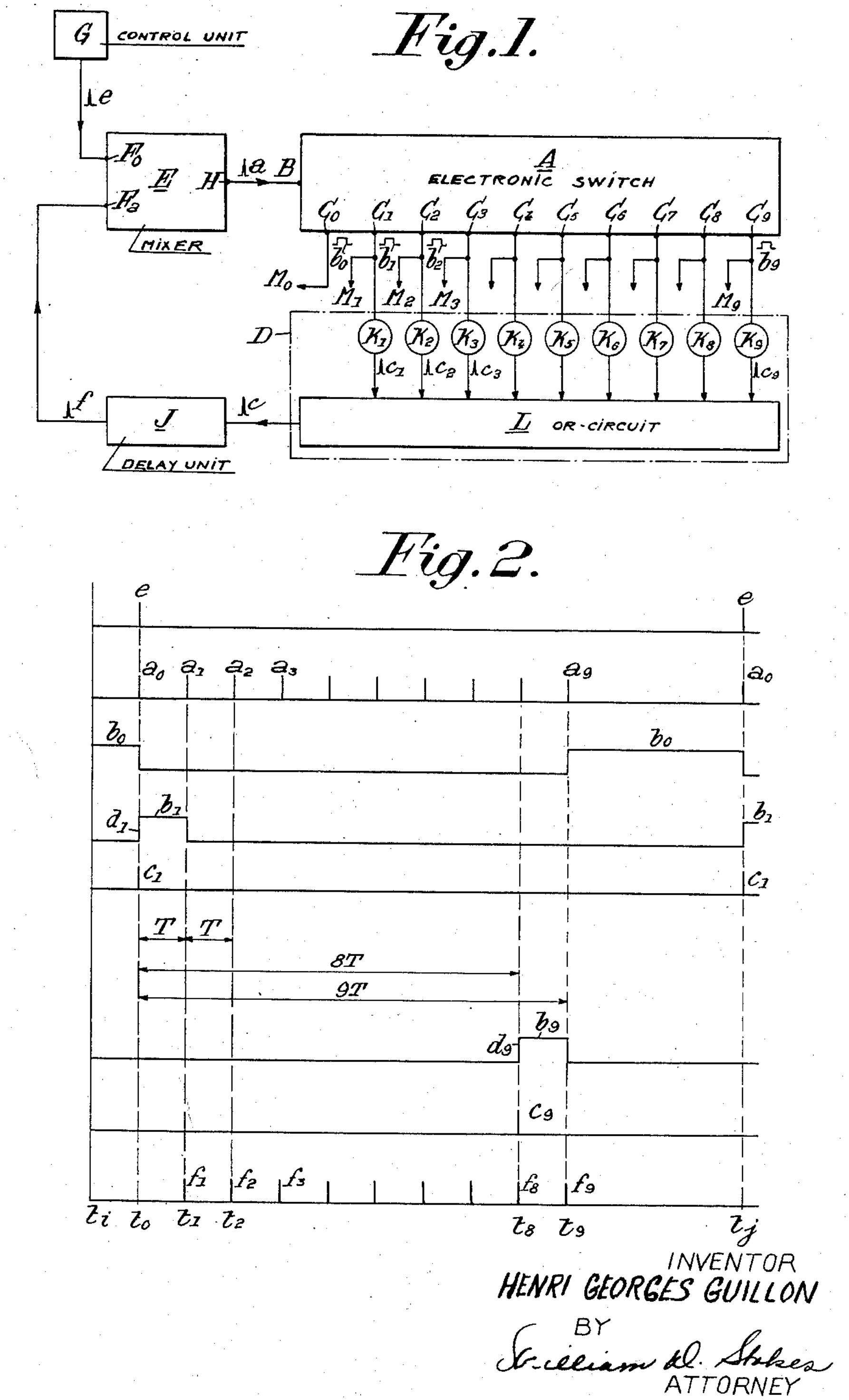
FIG. 1 shows, in block form, a sequential switching device according to the invention.
FIG. 2 is a graph showing the pulses and signals at different points of the device of FIG. 1.
Figure 5:
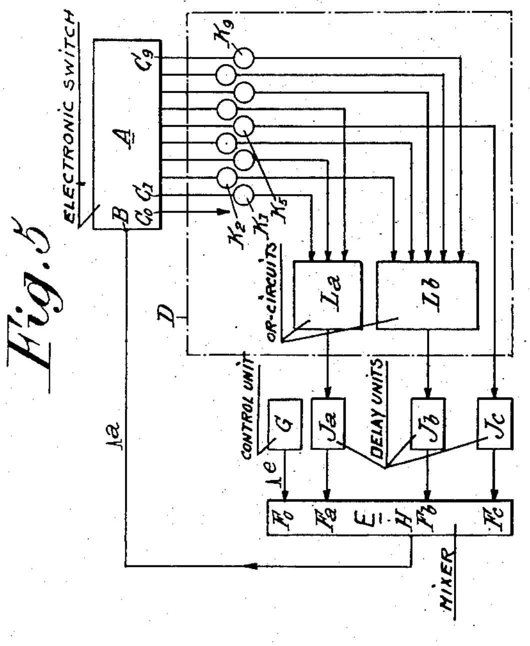
Figure 6:
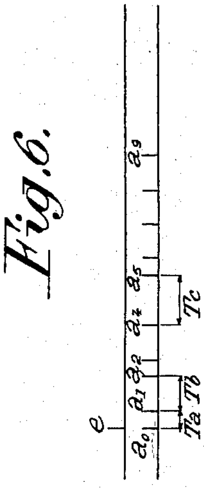
Figure 3:
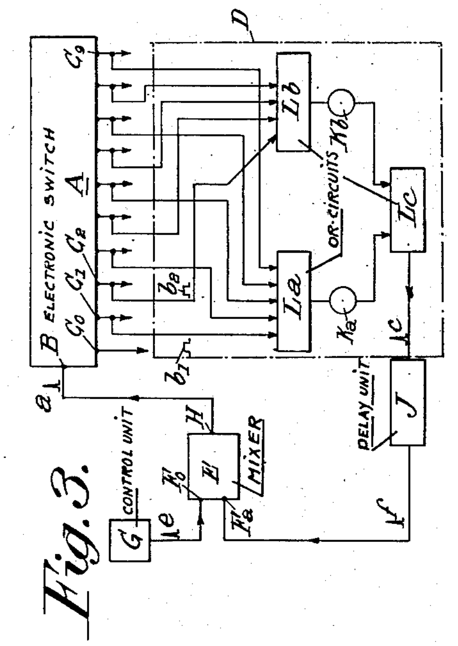
Figure 4:
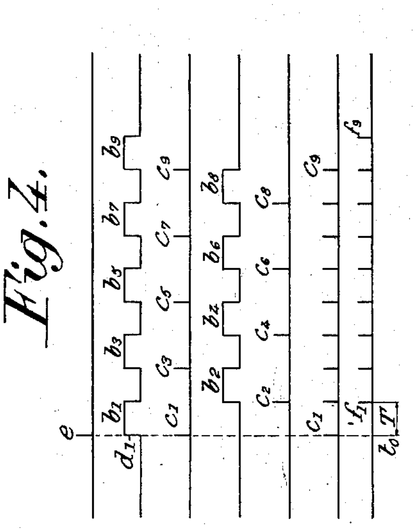
Figure 9:
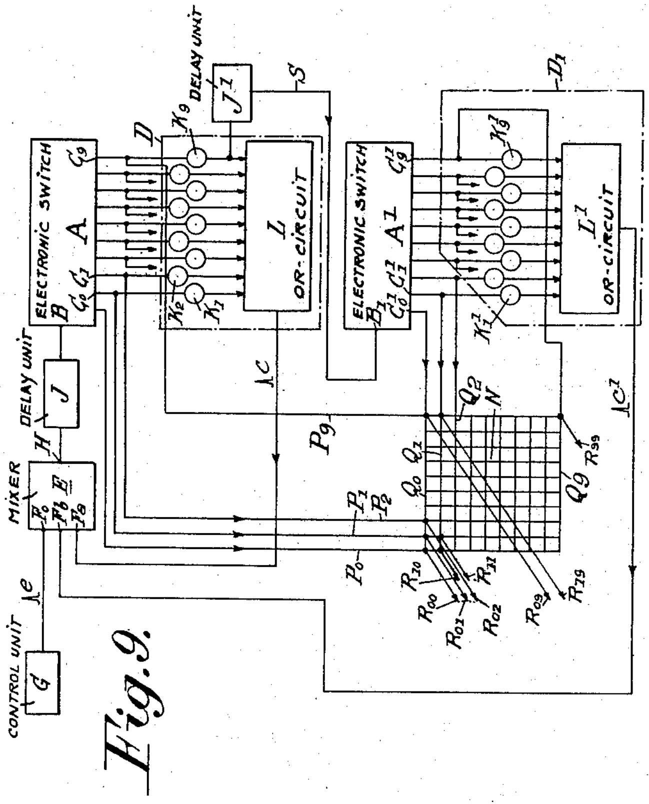
Figure 10:
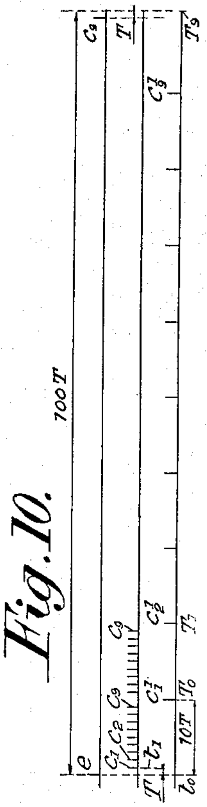
Figure 7:
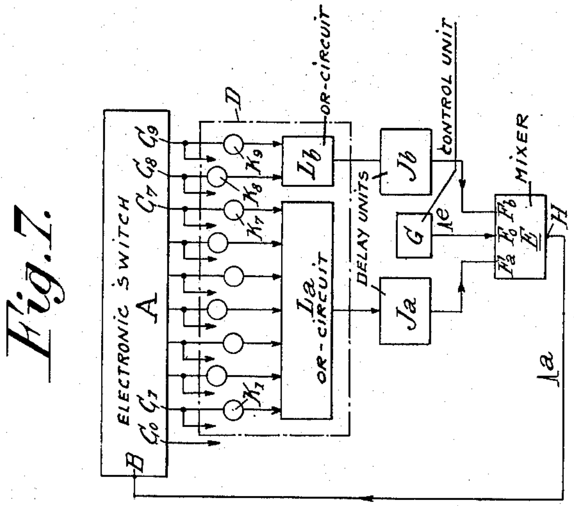
Figure 8:
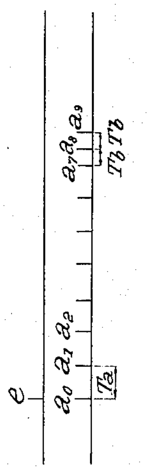
Figure 11:
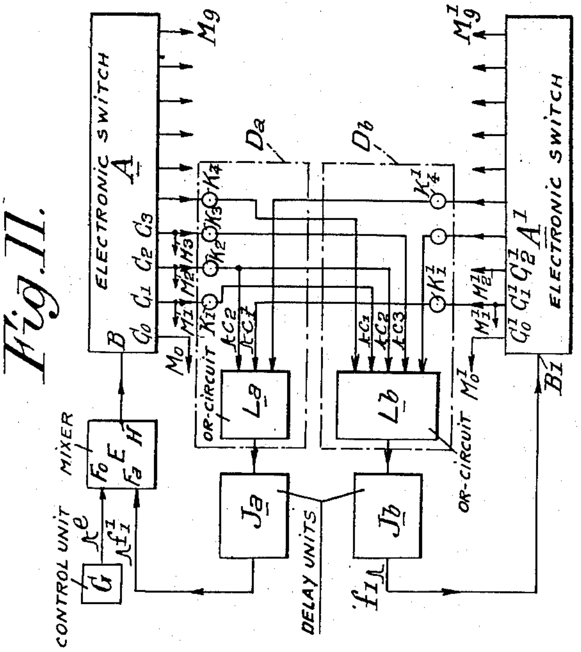
Figure 12:
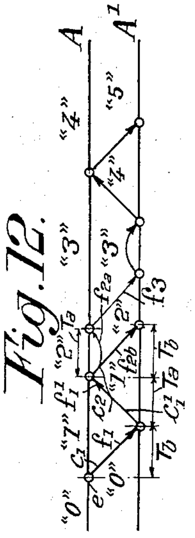
Figure 13:
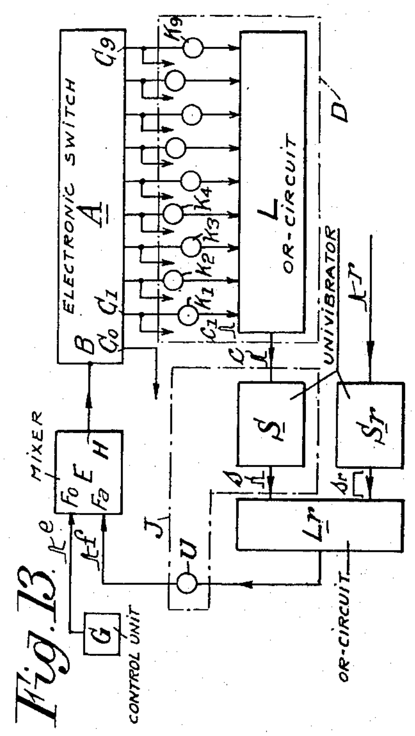
Figure 14:
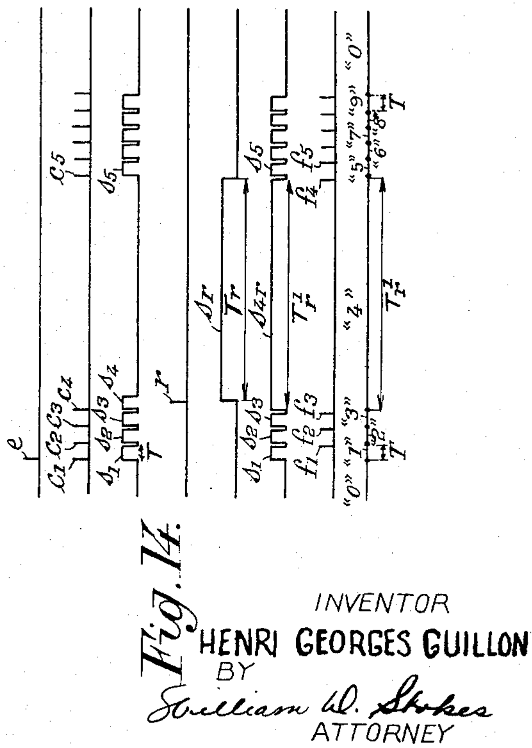
Figure 15:
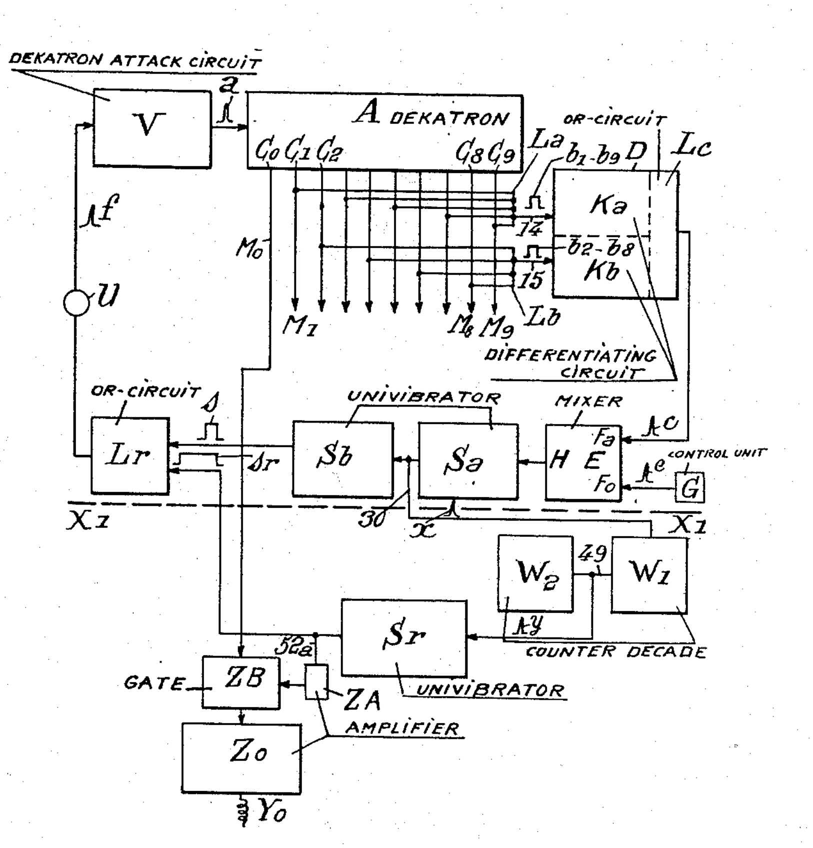
Figure 16:
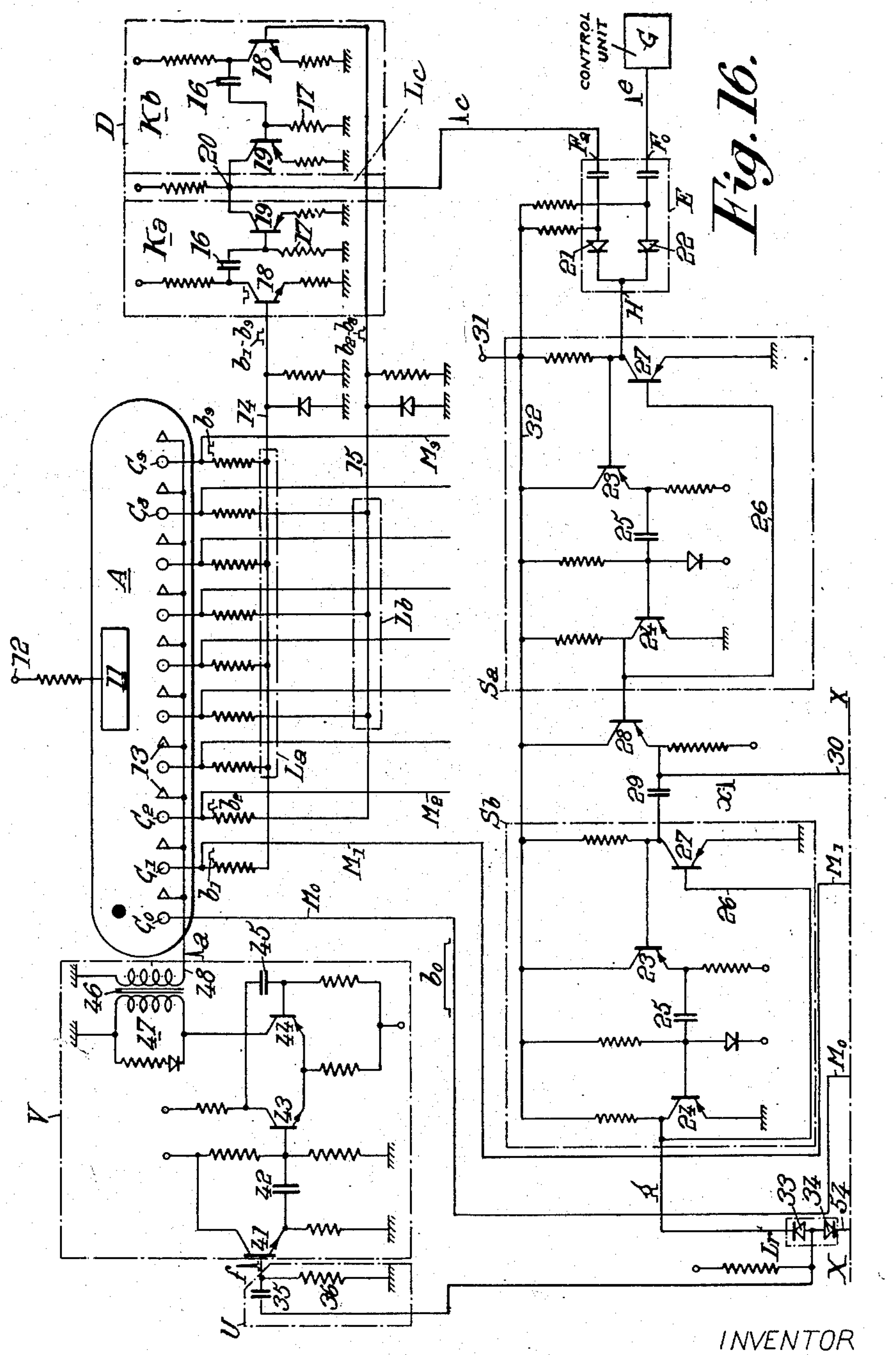
Figure 17:
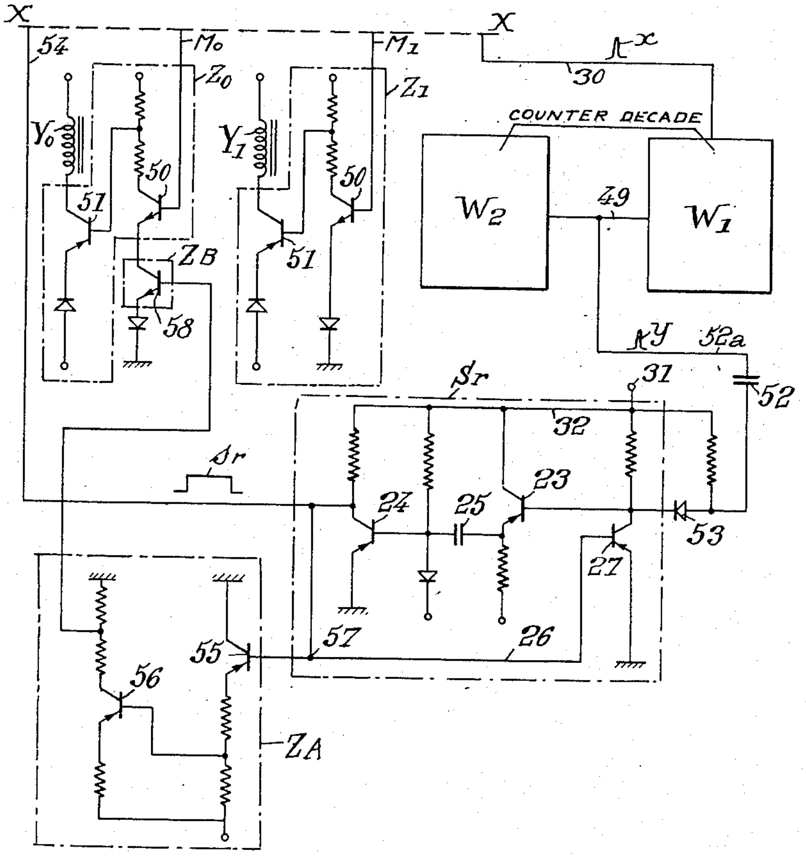

FIGS. 3, 5 and 7 diagrammatically show, in block form, three modifications of the sequential switching device of FIG. 1;

FIGS. 4, 6 and 8 are graphs showing the pulses and signals at different points of the devices of FIGS. 3, 5 and 7, respectively;

FIGS. 9 and 11 diagrammatically show, in block form, two embodiments of switching systems, respectively, each comprising two electronic switches, these systems being made according to the invention;

FIGS. 10 and 12 are graphs showing the pulses at different points of the system of FIG. 9 and the switchings obtained by the system of FIG. 11;

FIG. 13 shows a sequential switching device according to the invention making it possible to break the sequence;

FIG. 14 is a graph showing the pulses and signals at different points of the device of FIG. 13;

FIG. 15 diagrammatically shows, in block form, a switching device according to the invention intended to control a transfer of the components of a pulse counter to a printing machine;

FIGS. 16 and 17 (to be assembled together along line XX) show the detail of the device of FIG. 15.

A sequential switching device comprises in combination the following parts:

At least one electronic switch (a single switch A in the embodiments of FIGS. 1, 3, 5, 7, 13, 15 and 16, and two switches A and $A^1$ in the embodiments of FIGS. 9 and 11) having one input B and $n$ outputs C ($n$ being an integer greater than 2), this switch having $n$ distinct states (for instance ten states) in each of which it feeds one different output among its $n$ outputs C (for instance its ten outputs $C_0, C_1, C_2 \ldots C_9$) and passing, in response to a trigger pulse $a$ applied to its input B, from one state to the next one while feeding the output corresponding to this second mentioned state with a voltage or a signal $b$ (for instance a signal $b_0, b_1 \ldots b_9$ of positive polarity as shown in FIGS. 2 and 4);

Means D for deducing, from the feeding of some of said outputs (i.e. from the production of some of the signals $b$, for instance of only signals $b_1$ to $b_9$), output pulses $c$ (for instance output pulses $c_1$ to $c_9$ corresponding to signals $b_1$ to $b_9$, respectively) produced by the beginnings of these feedings (i.e. by the leading edges $d_1$ to $d_9$ of signals $b_1$ to $b_9$);

A mixer E having at least two inputs, said inputs comprising at least one first input $F_0$ connected to a control element G to receive therefrom the pulses $e$ which serve to start switching and at least one second input (a single one $F_a$ in the embodiments of FIGS. 1, 3, 11, 13, 15 and 16 and several ones $F_a$, $F_b$, $F_c$, in the embodiments of FIGS. 5, 7 and 9) which is connected to said means D for receiving said output pulses (either the output pulses $c$ such as they are produced, or these input pulses after they have been delayed to give pulses $f$) and an output H connected to the input B of said switch A to transmit thereto, as trigger pulses $a$, both the starting pulses $e$ received at its first input $F_0$ and the output pulses ($c$ or $f$) received at its second input $F_a$, $F_b$, $F_c$;

And at least one delay unit (a single unit J as in the constructions of FIGS. 1, 3, 9, or several units $J_a$, $J_b$, $J_c$, as in the constructions of FIGS. 5, 7 and 11) connected so as to delay at least said output pulses $c$ (either adapted to delay only these pulses by transforming them into delayed output pulses $f$ when the delay unit, or units, is, or are, disposed between means D and mixer E as in the constructions of FIGS. 1, 3, 5, 7, 11 and 13, or adapted to delay the trigger pulses, i.e. both the output pulses $c$ and the starting pulses $e$, when the delay unit is disposed between mixer E and switch A as it is the case in the constructions of FIGS. 9, 15 and 16).

More particularly, electronic switch A consists of a ring switch or, preferably, of a counter tube, for instance a decimal one (having ten states and ten outputs, such as a dekatron) or a duodecimal one (with twelve states and twelve outputs) or again a switch tube such as a trochotron;

The means D for deducing the output pulses $c$ consist of differentiating circuits $K_1$ to $K_9$; $K_a$, $K_b$; $K_1{}^1$ to $K_9{}^1$ (according to the constructions) of known type (for instance with a capacitor and a resistance in shunt) and of or-circuits or mixer circuits L, $L_a$, $L_b$, $L_c$, $L^1$ (according to the particular constructions) also of a known type (for instance comprising diodes mounted in shunt across the different inputs and a common output);

Mixer E consists of an or-circuit of the above mentioned type;

Every delay unit J, $J_a$, $J_b$, $J_c$ consists for instance, for small delays (smaller than ten micro-seconds), of a delay line comprising inductance coils and capacitors and, for greater delays, of a monostable multivibrator, delay monostable multivibrator or univibrator (i.e. a multivibrator having a stable state and a semistable state) followed by a differentiating circuit and a rectifier which passes only the pulse deduced by a differentiating circuit from the return of the univibrator to the stable state, which return takes place a given time, determined by the characteristics of the univibrator, after it has received the input pulse which has caused the shifting from the stable state to the semistable state.

Particular examples of electronic switches, differentiating circuits, or-circuits or mixers, and univibrators delay units will be given hereinafter when describing the detailed construction illustrated by FIGS. 16 and 17.

Some preferred embodiments of a sequential switching device according to this invention will now be described.

In a first embodiment, which is particularly simple and typical, illustrated by FIGS. 1 and 2, the switching device according to the invention comprises an electronic switch having ten states and comprising ten outputs $C_0$ to $C_9$ which successively deliver signals $b_0, b_1 \ldots b_9$, respectively, to corresponding lines $M_0, M_1, M_2, M_3 \ldots M_9$ for various uses, for instance in order to control sequences of given operations. Furthermore the outputs $C_1$ to $C_9$ (i.e. all outputs with the exception of $C_0$) are connected to differentiating circuits $K_1$ to $K_9$ respectively, the outputs of which are all connected to an or-circuit L which delivers output pulses *c*, through a delay unit J (which therefore delivers delayed pulses *f*) to the mixer or or-circuit E, which also receives starting pulses or orders *e* from a control unit G, switch A receiving from the output of mixer E its trigger pulses *a* consisting both of pulses *e* and of pulses *f*.

At the beginning of a cycle (time *ti*) switch A is in the zero state and delivers to its output $C_0$ the positive signal $b_0$ (third line of FIG. 2). This state is maintained until a starting pulse *e* is supplied (at time $t_0$) by control unit G (first line of FIG. 2). This pulse is transmitted to the input B of switch A where it acts as a trigger pulse $a_0$ (second line of FIG. 2). Under the effect of pulse $a_0$, switch A shifts to its state "one," stopping the transmission of signal $b_0$ to line $M_0$ and transmitting a signal $b_1$ (fourth line of FIG. 2) to line $M_1$. The leading edge $d_1$ of this signal, differentiated in circuit $K_1$, produces a pulse $c_1$ (fifth line of FIG. 2) which, transmitted through the or-circuit L, is delayed by a time T by delay circuit J, thus giving a pulse $f_1$ (last line of FIG. 2). This pulse is transmitted to the input B of switch A through mixer E and acts as a trigger pulse $a_1$ (second line of FIG. 2) at time $t_1=t_0+T$. Pulse $a_1$ produces a new switching of switch A, which passes to state "two" thereof, stopping the delivery of signal $b_1$ to line $M_1$ and delivering a signal $b_2$ through line $M_2$. In the same manner as above described for $b_1$, the leading edge of $b_2$ creates a pulse $c_2$ in $K_2$ and said pulse $c_2$, transmitted through L and delayed by J to produce signal $f_2$, comes, after having passed through E, as a trigger pulse $a_2$, to the input B of A at time $t_2=t_1+T=t_0+2T$ so that a new switching of A takes place and so on. Switch A successively comes into states "three," "four," "five," "six," "seven," "eight" and "nine." At this time (time $t_8=t_0+8T$)

the electronic switch delivers to its outputs $c_9$ a signal $b_9$ (sixth line of FIG. 2) the leading edge $d_9$ of which is differentiated in circuit $K_9$ to produce pulse $c_9$ (seventh line of FIG. 2). After having passed through L, this pulse is delayed to give a pulse of $f_9$ (last line of FIG. 2) in circuit J. This pulse, after passing through E, acts, as a pulse $a_9$ (second line of FIG. 2) on the input B of switch A which returns into its "zero" state (which is that which follows state "nine") at time $t_9=t_0+9T$. Signal $b_9$ ceases whereas signal $b_0$ is again produced at the output $C_0$ of switch A (third line of FIG. 2). The cycle of successive automatic switchings then ceases because output $C_0$ is not connected to a circuit K and serves only to feed line $M_0$. The initial state of the device is therefore restored and lasts until a new starting pulse *e* is received, at time *tj*. The switching cycle therefore has a duration equal to 9T and the switching device comprises a stable state (state "zero") and nine semistable states (states "one" to "nine"), in each of which it remains for a time T, shifting from the stable state (state "zero") to a first semistable or astable state (state "one") taking place under the effect of a starting pulse *e*, whereas the other shiftings take place automatically, each after a time T, until the device returns to the initial stable state. The device is therefore a development of the delay monostable multivibrator or univibrator (a univibrator has a stable state and a semistable state, shifting from the first state to the second one taking place under the effect of a starting pulse, and return to the first, or stable, state taking place after a predetermined time).

It should be readily understood that a switching device according to FIG. 1 may have many applications. For instance it may constitute a self-commutating switch, a single signal or order *e* serving to start a cycle of switchings. In particular, it permits of controlling, through lines $M_0$ to $M_9$, a sequence of successive operations started by a single order *e*. This device may also constitute a generator of a predetermined number of pulses. It is thus possible to collect either ten pulses *a* (or more generally *n* pulses when switch A has *n* states) from output H, or nine pulses *c* of *f* (more generally $n-1$ pulses) from the output of circuit L or of unit J, the number ($n$ or $n_1$ according to the point from which the pulses are collected) of pulses obtained in every train, in response to a starting pulse *e*, being perfectly well determined.

Of course, in the modification of FIG. 1, delay unit J, instead of being disposed, as shown, between L and E, might be connected between E and A and, in this case, the first switching of switch A, from state "zero" to state "one," would be delayed by a time T with respect to the starting pulse *e* because this pulse *e* would undergo a delay T in unit J. As a matter of fact, such an arrangement is used in the constructions of FIGS. 9, 15 and 16 to be described hereinafter. In the case of this modification of the embodiment of FIG. 1, mixer E and the or-circuit L (which would no longer be separated from each other by J) might be combined together into a single unit. The lay-out would then be analogous to that of FIG. 1, with the exception that control element G would deliver its pulses *e* to a tenth input of the or-circuit L (this tenth input being provided in addition to the ninth input shown by the drawings and connected to the outputs of circuits $K_1$ to $K_9$) and the output of unit J would be connected directly to point B, the unit E shown by FIG. 1 being cancelled (as a matter of fact it is incorporated into circuit L).

On the other hand, concerning the production of delay T by means of univibrator, when the switching time of switch A is too short to permit a new triggering of a univibrator after its return to the stable state (because this return is followed by a "dead time," or period during which the univibrator is not capable of responding to new incoming pulses), it is possible to provide not one but two univibrators connected in series, each of these univibrators supplying a portion (for instance one half) of delay T.

It is also possible, in order to obviate the above mentioned difficulty, to use two univibrators mounted in shunt, so as alternatively to receive the pulses to be delayed. In this case it is possible to simplify the means D serving to produce pulses *c* from the output signals *b*. The simplification consists in reducing the number of differentiating circuits K. An embodiment of such an arrangement is illustrated by FIGS. 3 and 4.

In this construction, means D consist of three or-circuits $L_a$, $L_b$, $L_c$ and of only two differentiating circuits $K_a$ and $K_b$ for obtaining signals $c_1$ to $c_9$. The odd numbered outputs $C_1, C_3, C_5, C_7, C_9$ of switch A are connected, through the or-circuits $L_a$, to the differentiating circuit $K_a$ which therefore delivers signals $b_1$, $b_3$, $b_5$, $b_7$, $b_9$ to produce pulses $c_1$, $c_3$, $c_5$, $c_7$, $c_9$ (fifth line of FIG. 4) whereas the even numbered outputs $C_2$, $C_4$, $C_6$, $C_8$, of switch A are connected, through the or-circuit $L_b$, to the differentiating circuit $K_b$ which therefore differentiates signals $b_2$, $b_4$, $b_6$, $b_8$, to produce pulses $c_2$, $c_4$, $c_6$, $c_8$ (fifth line of FIG. 4).

The five pulses delivered by $K_a$, and the four pulses delivered by $K_b$ are transmitted through the or-circuit $L_c$, which delivers the nine output pulses $c_1$ to $c_9$ (sixth line of FIG. 4) to delay unit J. This delay unit supplies the delayed pulse $f_1$ to $f_9$ (seventh line of FIG. 4) which serve, through mixer E, to produce the successive switchings of switch A as in the case of FIG. 1.

It is possible, as above indicated, to replace delay unit J by two identical univibrator units disposed one between $K_a$ and $L_c$ and the other between $K_b$ and $L_c$. In this case, one of the delay units serves to delay the odd numbered pulses $c_1$, $c_3$, $c_5$, $c_7$, $c_9$, whereas the other one serves to delay the even numbered pulses $c_2$, $c_4$, $c_6$, $c_8$. Thus the univibrators are triggered sufficiently late after they return to the stable state to be able to operate in good conditions (they are triggered only after the end of the "dead time" which immediately follows their return to the stable state and during which they are not capable of responding to a new pulse).

It will be readily understood that the switching device according to the invention can easily be adapted to produce sequences requiring different time intervals between the different operations, that is to say, variable durations of the different states of switch A. If these variable durations have $m$ common values ($m$ smaller than $n-1$), use is made of $m$ delay units mounted in shunt. FIG. 5 illustrates a construction in which $m=3$ and $n=10$.

The outputs of the differentiating circuits K (such as $K_1$) corresponding to the states the duration of which must be $T_a$ are connected, through an or-circuit $L_a$, to a delay unit $J_a$ supplying the delay $T_a$. Likewise the outputs of the circuits K (such as $K_2$) corresponding to the states the duration of which must be $T_b$ are connected, through an or-circuit $L_b$, to a delay unit $J_b$ supplying this delay $T_b$. Finally, the output of circuit $K_9$, corresponding to the state the duration of which must be $T_c$ is connected directly to a delay unit $J_c$ supplying this delay $T_c$. The outputs of $J_a$, $J_b$, $J_c$, are connected with the inputs $F_a$, $F_b$, $F_c$ of mixer E the input $F_0$ of which receives orders $c$ from control unit G. The successive trigger pulses $a$, to wit $a_0$ to $a_9$, supplied by mixer E have different time intervals between them, as shown by the second line of FIG. 6.

FIGS. 1, 3, 5 and 13 (the last one to be described hereinafter) illustrate switching devices having ten states (one stable state and nine semistable states) obtained preferably with decimal tubes. Such tubes may also permit of obtaining switching devices having a different number of states. For instance it is possible to use only a portion of the outputs of a decimal (or duodecimal) tube, while preferably accelerating the passage through the states the outputs of which are not used (so as to reduce the loss of time).

FIG. 7 illustrates a disposition where only the seven first states of the decimal tube are used. In this case the outputs $C_1$ to $C_7$ are connected, through respective differentiating circuits $K_1$ to $K_7$, to the inputs of an or-circuit $L_a$ the output of which is connected with a delay unit $J_a$ which introduces the delay $T_a$ corresponding to the desired duration of the states that are used. As for outputs $C_8$ and $C_9$ they are connected, through two differentiating circuits $K_8$ and $K_9$, respectively with the inputs of an or-circuit $L_b$ the output of which is connected with a delay unit $J_b$ (which may consist of a delay line) which introduces a very small delay $J_b$.

The outputs of $J_a$ and $J_b$ and the output of control unit G are connected to the inputs $F_a$, $F_b$ and $F_0$ respectively of mixer E which transmits the trigger pulses $a$ to switch A.

FIG. 8 illustrates the time distribution of the successive pulses $a$ ($a_0$ to $a_9$) and consequently the times for which switch A remains in the different semistable states, to wit, $T_a$ for the states that are used and $T_b$ for the states that are not used, $T_b$ being smaller than $T_a$.

When it is desired to obtain, by means of a tube having ten or twelve states, a device in which only a submultiple of these states is to be used (for instance five states for a decimal tube and six or four states for a duodecimal tube) it suffices to connect together several equidistant outputs C, for instance inputs $C_0$ and $C_5$, $C_1$ and $C_6$, $C_2$ and $C_7$, $C_3$ and $C_8$, $C_4$ and $C_9$, in the case of a decimal tube in order to obtain a switch A having one stable state (state "zero-five") and four semistable states which are states "one-six," "two-seven," "three-eight" and "four-nine."

On the other hand, it is also possible to obtain with decimal (or duodecimal) tubes, switching devices according to the invention having more than ten (or twelve) states. Thus it is possible, by disposing two or three decimal tubes in series to obtain a switching device having eighteen or twenty-seven states (the first of which is stable whereas the others are semistable) by connecting the output line $C_9$ of the first tube (or of the two first tubes) with the input of the next tube, the switching of which is thus started. Of course, any number of states between eleven and eighteen may be obtained with two tubes (or between nineteen and twenty-seven with three tubes) by using only some of the states and accelerating the passage through the other states as in the example of FIG. 7 relating to a single decimal tube.

In order to provide a switching device according to the invention having a greater number of states, for instance a number ranging from twenty eight to one hundred, it is advantageous to make use of the arrangement of FIG. 9, which, by means of two decimal tubes A, $A^1$ and of a matrix N providing $10\times10=100$ coincidences, supplies 100 states, the whole or a portion of which may be used.

In this construction, tube, or switch, A is connected as in the construction of FIG. 1, with the difference that the delay unit J is disposed downstream of mixer E, instead of upstream thereof and that the output of differentiating circuit $K_9$ is further connected, through conductor S and a delay unit $J^1$ (identical to J) to the input $B_1$ of tube, or switch, $A^1$. This switch $A^1$ is connected, in the same manner as switch A. That is to say its outputs $C_1^1$ to $C_9^1$ are connected to differentiating circuits $K_1^1$ to $K_9^1$, the outputs of which lead to an or-circuit $L^1$ which delivers successive pulses $c^1$, to wit $c_1^1$ to $c_9^1$ (third line of FIG. 10) to the input $F_b$ of mixer E, whereas the input $F_a$ of said mixer E receives successive pulses $c$, to wit $c_1$ to $c_9$ (second line of FIG. 10) from the or-circuit L, and the third input $F_0$ receives the orders $e$ (first line of FIG. 10). Finally, the outputs $C_0$ to $C_9$ of switch A, are connected to the vertical columns $P_0$, $P_1$, $P_2$ . . . $P_9$ of matrix N, whereas the horizontal lines $Q_0$, $Q_1$, $Q_2$ . . . $Q_9$ of said matrix are connected to the outputs $C_0^1$ to $C_9^1$ of switch $A^1$. An output line R is connected to every point of intersection of a column and of a line of matrix N. Therefore there are $10\times10=100$ outputs, to wit from $R_{00}$ to $R_{99}$.

The operation of the switching device of FIG. 9 is as follows, reference being made to FIG. 10 which shows the time distribution of pulses $e$, $c$ and $c^1$.

Initially, switches A and $A^1$ are both in the state "zero" and deliver, through their respective outputs $C_0$ and $C_0^1$, positive signals which are sent to column $P_0$ and line $K_0$, respectively, of matrix N and therefore to output $R_{00}$.

At time $t_0$ (fourth line of FIG. 10), a starting order or pulse $e$ is transmitted from G to E and therefore to J which introduces a delay T. It follows that, at time $t_1=t_0+T$, a positive signal is produced at the output $C_1$ of A (which has shifted to state "one"), and therefore in the column $P_1$ of matrix N. Since line $K_0$ is still fed with current, the output $R_{01}$ is supplied with current.

As soon as the output $C_1$ of A is fed, circuit $K_1$ has produced pulse $c_1$ (at time $t_1$). This pulse, after passing through L and E, is transmitted to J which delays it by T before reintroducing it into switch A, which then passes to its state "two" while delivering signal through its output $C_2$, which feeds the column $P_2$ of the matrix and the output $R_{02}$ thereof and forms a pulse $c_2$ in circuit $K_2$. The switching of A from one state to the next one goes on as above explained with reference to FIGS. 1 and 2, so that pulses are successively sent to the different columns P of matrix N and successive pulses $c$ are produced, and this until switch A comes into state "nine" where a signal is fed to line $P_9$ and therefore the output $R_{09}$ of matrix N is fed with current, whereas pulse $c_9$ is transmitted by L. This pulse $c_9$ therefore serves not only, through E and J, to return switch A to state "zero" but also, through conductor S leading to the input $B_1$ of switch $A^1$, to bring said switch into state "one," after said pulse $c_9$ has been delayed by a time T in the unit $J^1$, identical to J.

Switch $A^1$, now in state "one" sends a signal through its output $C_1^1$ to the line $Q_1$ of matrix N. Since column $P_0$ is now receiving a signal from the output $C_0$ of A (because pulse $c_9$ has caused switch A to return to state "zero" at time $T_0=t_0+10T$), the output $R_{10}$ of matrix N is then fed. At the same time, unit $K_1^1$ produces a pulse $c_1^1$ which, through $L^1$, E and J, produces, at time $T_0+T$, a new switching of A which passes to state "one." A new cycle of switchings of A now begins but this time $A^1$ is in state "one" and delivers a signal through its output $C_1^1$ to line $Q_1$, so that the outputs R of matrix N connected to this line $Q_1$ are fed (these outputs being $R_{10}$, $R_{11}$ . . . $R_{19}$). When switch A returns to state "nine" a new pulse $c_9$ is produced by $K_9$ and this pulse $c_9$, transmitted through E and J to switch A, returns it to its state "zero" at time $T_1=t_0+20T$, and at the same time said pulse $c_9$, transmitted through $J_1$ and conductor S, switches $A^1$ into state "two." A first cycle of switchings of A then takes place, with $A^1$ in state "two" and therefore transmitting the signals to line $Q_2$. The switchings of A then cause the different outputs R of matrix N connected with said line $Q_2$ to be fed. The switchings of A at time intervals T and of $A^1$ at time intervals 10T go on to feed the different outputs R of the matrix successively until, switch $A^1$ being in state "nine," switch A also comes to state "nine." At this time, $t_0+99T$, the signals are transmitted to the line $Q_9$ and the column $P_9$ of matrix N and therefore the output $R_{99}$ of said matrix is fed. Then at time $T_9=t_0+100T$, pulse $c_9$, transmitted through J and $J^1$, causes both of the switches A and $A^1$ to return to state "zero," which finishes a complete cycle of one hundred switchings and again causes the output $R_{00}$ of matrix N to be fed. The initial state has then been returned to and it lasts until a new starting pulse $e$ is transmitted from G.

In a modification, instead of providing a delay unit $J^1$, the input $B_1$ of switch $A^1$ is connected to the output $C_9$ of switch A, through a differentiating circuit which causes $A^1$ to be triggered by the trailing edge of the signal delivered by $C_9$. This modification simplifies the layout and permits the introduction of an identical delay by J and by this supplementary differentiating circuit, which was difficult to obtain for J and $J^1$.

In the various embodiments, whatever be the number of outputs, it is possible to transform one or several semistable states into a stable state or stable states by cancelling the corresponding input or inputs of the or-circuits placed in the feed back loop. The sequence is thus broken and is resumed only by the application of an order $e$ from the outside. An example of this is illustrated by FIG. 11, which also ensures the coupling of several switching devices according to the invention.

The device of FIG. 11 comprises:

Two switches, for instance two decimal tubes, A and $A^1$. Among the outputs C and $C^1$ of these tubes only those corresponding to semistable states are connected to differentiating circuits K, $K^1$;

Two or-circuits L*a*, L*b*, every input of which is connected to the output of a differentiating circuit (some differentiating circuits, such as $K_2$ may be connected to an input of L*a* and an input of L*b*);

Two delay units, respectively J*a* introducing a delay T*a*, and J*b* introducing a delay T*b* (T*a* and T*b* being either equal to each other or different); the output of J*b* is directly connected to the input $B_1$ of $A^1$, whereas the output of J*a* is connected to one of the inputs of a mixer E, the other input of E receiving starting pulses $e$ from control unit G, whereas its output is connected to the input B of A.

The operation of the device of FIG. 11 is as follows (reference being also made to FIG. 12, which indicates between inverted commas the successive states of switches A and $A^1$, and also represents the pulses transmitted and received by the switches).

The starting pulse $e$, delivered by G, passes through mixer E and shifts switch A from its initial stable state or state "zero," in which it delivers a signal through its output $C_0$ to line $M_0$, to its state "one" in which it delivers a signal through output $C_1$ to line $M_1$ and into the differentiating circuit $K_1$. This last mentioned circuit deduces, from the leading edge of the received signal, a pulse $c_1$ which passes through L*b* and is delayed by a time T*b* in unit J*b*. The delayed pulse $f_1$ shifts $A^1$ from the stable state of rest or state "zero," in which it delivers a signal through its output $C_0^1$ to line $M_0^1$, to its state "one" in which it delivers a signal through its output $C_1^1$ to line $M_1^1$ and to the differentiating circuit $K_1^1$ which deduces a pulse $c_1^1$ from the leading edge of said signal. The last mentioned pulse passes through L*a* and is delayed by a time T*a* in unit J*a*, thus becoming the delayed pulse $f_1^1$ which is fed back through mixer E to switch A. This switch A therefore passes into state "two" a time $Tb+Ta$ after reception of pulse E which had shifted it into state "one." When passing to state "two," switch A delivers through its output $C_2$ a signal, the leading edge of which is transformed by circuit $K_2$ into a pulse $c_2$. This pulse $c_2$ is applied on the one hand to J*a* through L*a*, and on the other hand to J*b* through L*b*, giving two pulses delayed by times T*a* and T*b* respectively. The first of these pulses, $f_{2a}$ (FIG. 12), applied to A through E, shifts A to state "three" and the second pulse, $f_{2b}$, applied to $A^1$, shifts it to state "two," these two shiftings taking place at times $Tb+Ta+Ta$, and $Tb+Ta+Tb$, respectively, after the reception of $e$. At the state "two" of switch $A^1$ which must be a stable state, the output $C_2^1$ of the switch does not deliver a signal into line $M_2^1$. On the contrary output $C_3$ delivers a signal not only to line $M_3$, but also to differentiating circuit $K_3$ which deduces a pulse $c_3$ from the leading edge of this signal, which enables the sequential switching to go on under the effect of pulse $c_3$ which passes through L*b* and is delayed in J*b*. The delayed pulse $f_3$ thus produced shifts switch $A^1$ into the semistable state "three." Switching goes on according to the wiring between the outputs of A and $A^1$ on the one hand, and the circuits L*a* and L*b* on the other hand (only a portion of this wiring has been shown).

It will be readily understood that it is possible, in this way, to obtain any desired succession of switchings, by making use of two or more switches in parallel and two or more or-circuits and delay units. It is thus possible to send separate orders through lines $M_0$, $M_1$, . . . $M_9$, $M_0^1$, $M_1^1$, . . . $M_0^1$, at different times but in relation to one another.

It may also be desirable, in some cases, to break the sequence by increasing the duration of a given state, generally a semistable one. The switching device, which is connected to different circuits, then acts as a searcher. When a favorable answer is obtained in one of the circuits an operation of some duration is started. In order to increase the duration of stopping in a given state, use may be made of the arrangement of FIG. 13. This arrangement corresponds substantially to that of FIG. 1, including a switch A, the input B of which is connected to the output H of a mixer E, the outputs $C_1$ to $C_9$ of said switch being connected, through differentiating circuits $K_1$ to $K_9$, to an or-circuit L, the output of which is connected to a delay circuit J comprising a univibrator S and a differentiating circuit U; but, furthermore, the arrangement of FIG. 13 comprises a second univibrator $Sr$, receiving a signal $r$ corresponding to the answer from the outside, and an or-circuit $Lr$ the inputs of which are connected to the outputs of univibrators S and $Sr$, respectively, the output of said circuit $Lr$ being connected to a differentiating circuit U. The delay $Tr$ introduced by $Sr$ is greater than delay T introduced by S and corresponds to the desired increase in the duration of the state.

Mixer E receives, through its input $F_0$, a signal from a control unit G and through its input $F_a$ the signal transmitted by the input of differentiating circuit U.

The operation of the device of FIG. 13 is as follows, with reference also to FIG. 14 which illustrates the signals and pulses that are produced in this device.

After an order $e$ (first line of FIG. 14) has been transmitted by unit G, the operation begins in the same manner as in the case of the device of FIG 1. Circuits $K_1$, $K_2$, $K_3$ produce pulses $c_1$, $c_2$, $c_3$ (second line of FIG. 14) which pass through L and cause univibrator S to shift from the stable state to the semistable state, this univibrator returning after a time T to the stable state and emitting, while it is in the semistable state, a signal $s_1$, $s_2$, $s_3$ (third line of FIG. 14) of a duration equal to T. The trailing edge of the signal produces in circuit U delayed pulses $f_1$, $f_2$, $f_3$ (seventh line of FIG. 14) fed back through E to switch A. If it is supposed that pulse $r$ which indicates a favorable answer and therefore must increase the time for which the switch remains in one state, takes place while the switch is in state "four," univibrator $Sr$ is triggered by pulse $r$ during the signal $s_4$ (fourth and sixth lines of FIG. 14). Univibrator $Sr$ thus delivers a signal $sr$ the origin of which corresponds to signal $r$ and the duration of which is $Tr$. Consequently, signal $Sr$ overlaps the end of signal $s_4$ (third and fourth lines of FIG. 14) and the return of S to its stable state does not appear at the output of the or-circuit $Lr$ (which is represented in the sixth line of FIG. 14). This output, after it has delivered signals $s_1$, $s_2$, $s_3$ without modification, delivers a signal $S_{4r}$ of increased duration (its duration $T_r^1$ being comprised between $Tr$ and $Tr+T$, according to the time at which $r$ has occurred with respect to signal $s_4$. The end of $sr$ and therefore of $s_{4r}$ produces in circuit U the pulse $f_4$ which causes switch $A^1$ to shift to state "five" and the cycle goes on normally as in the case of FIG. 1. The line of FIG. 14 shows the times corresponding to the shifting of switch A from one state to the next one and the times (T and $T_r^1$) for which A remains in the different states indicated between inverted commas.

The application of a device of the type of that illustrated by FIG. 13 to the transfer of the contents of a pulse counter, such as a decade counter, to a printing machine, will now be described with reference to FIG. 15 (block diagram) and 16—17 (which are to be assembled together along line XX).

The switching device proper (portion above line $X_1X_1$ in FIG. 15, or the detailed showing in FIG. 16 that corresponds thereto) is similar to that of FIG. 13. However, on the one hand, as in the modification of FIG. 9, mixer E is provided upstream of units $Sa$, $Sb$, U which introduces the delay and, on the other hand, as in the modification of FIG. 3, the means D for deducing the output pulses consist of two differentiating circuits $Ka$, $Kb$, the first of these circuits, $Ka$, having its input connected to the output of an or-circuit $La$ having its inputs connected with the odd numbered outputs of switch A, whereas the second of these differentiating circuits, $Kb$, has its inputs connected with the even numbered outputs of switch A. The switching device comprises:

A switch A, such as a decimal gas tube of the dekatron type, the anode 11 of which is connected to the positive high voltage (averaging 450 volts) at 12 and the cathodes or outputs $C_0$ to $C_9$ of which act successively as second electrode for the gaseous discharge (the first electrode being the anode), owing to the presence of disymmetrical transfer electrodes 13. The outputs $C_0$, $C_1$ . . . $C_9$ are connected to utilization lines $M_0$, $M_1$, . . . $M_9$; the five odd numbers outputs $C_1$ to $C_9$ are connected through a conductor 14 (playing the part of the or-circuit $La$ of FIG. 3) to the input of a first differentiating circuit $Ka$ and the four even numbered outputs $C_2$ to $C_8$ are also connected through a conductor 15 (playing the part of the or-circuit $Lb$ of FIG. 3) to the input of a second differentiating circuit $Kb$;

Means D for deducing from the signal $b_1$ to $b_9$ delivered at the outputs $C_1$ to $C_9$ pulses $c_1$ to $c_9$ synchronous with the respective leading edges of these signals, said means D comprising two identical differentiating circuits $Ka$, $Kb$ (each consisting of a circuit comprising a capacitor 16 in series and a resistor 17 in shunt across two amplifier transistors, to wit a NPN transistor 18 and a PNP transistor 19) and an or-circuit $La$, consisting of the mere connection at 20 of the two outputs of circuits $Ka$ and $Kb$, transistors 19 acting both as rectifiers (that is to say playing the part of the customary diodes in or-circuits) and as amplifiers;

A mixer E comprising two diodes 21, 22; diode 21 transmits the positive pulses $c$ delivered by the differentiating circuits $Ka$, $Kb$ to input $Fa$, whereas diode 22 transmits the starting pulses $e$ arriving from control unit G to input $F_0$;

Two identical univibrators $Sa$, $Sb$, chosen so that the duration of their semistable state is for instance 0.5 millisecond; each of these univibrators essentially comprises two PNP transistors 24 and 27, the PNP transistor 23 forming a connection stage, mounted as an emitter-follower (lay-out analogous to a cathode-follower layout for a triode), between the collector of transistor 27 and the base of transistor 24 through capacitor 25, whereas the collector of 24 is connected through conductor 26 to the base of 27; the collector of 27 receives the starting pulse $e$ or $c$ which shifts the univibrator from its stable state to its semistable state while producing a voltage abrupt rise signal; the connection between univibrators $Sa$ and $Sb$ takes place through an amplifier PNP transistor 28, mounted as an emitter-follower in the same manner as transistors 23, and a capacitor 29, an intermediate output being formed by conductor 30 to permit of collecting interrogation pulses $x$ serving to transfer from the decimal counter $W_2$, $W_1$ of FIG. 16; the two univibrators are fed from a source 31 (of, for instance, 9 volts) through the conductor 32;

An or-circuit $Lr$, comprising two diodes 33, 34; diode 33 transmits the signals $s$ delivered by the whole of univibrators $Sa$ and $Sb$ in series, whereas diode 34 transmits the signals $sr$ corresponding to a favorable answer and arriving (as hereinafter explained) through conductor 54 (see FIG. 17);

A differentiating circuit U (consisting of a capacitor 35 in series and a receiver 36 in shunt) which delivers pulses $f$ corresponding to the trailing edge of signals $s$ or $sr$;

A unit V for attacking dekatron A comprising a NPN transistor 41 mounted as an emitter-follower, a coupling capacitor 42, a univibrator including a NPN transistor 43 and a PNP transistor 44 (coupled, on the one hand, through their emitters and, on the other hand, through a capacitor 45 inserted between the collector of the input transistor 43 and the base of the output transistor 44) and a step-up transformer 36, the primary of which is connected to a damping circuit 47, and the secondary of which delivers starting pulses *a* of 60 volts capable of switching dekatron A through conductor 48 connected to the switching or transfer electrodes 13.

Of course, in a modification, the starting pulses *e* might be introduced downstream of the whole of the units S*a*, S*b*, U, which serve to introduce the delay, unit E being disposed at U and V. The first switching of the dekatron from state "zero" to state "one" would then take place immediately after reception of every pulse *e*. It would also be possible to collect the interrogation pulses *x* either upstream of S*a* or downstream of S*b*.

The portion of the lay-out of FIG. 15 below line $X_1X_1$, or the detailed showing in FIG. 17 that corresponds thereto comprises the system which permits, by means of the switching device of FIG. 16 (i.e. of the portion of the lay-out of FIG. 15 located above line $X_1X_1$) of printing the digit obtained in an electronic decade, such as $W_1$, of a counter including several decades. In the drawing, two successive decades $W_1$ and $W_2$ have been shown (that corresponding to the units and that corresponding to the tens, for instance). Transfer is effected through line 49. This system comprises:

Ten amplifiers $Z_0$ to $Z_9$ (only two of which have been shown, to wit, $Z_0$ and $Z_1$) each consisting of a NPN transistor 50 and a PNP transistor 51, each amplifying a signal $b_0$, $b_1$ . . . $b_9$, which they receive from a respective output $C_0$, $C_1$ . . . $C_9$ through a conductor $M_0$, $M_1$ . . . $M_9$, respectively;

Ten solenoids $Y_0$ to $Y_9$ (only two of which $Y_0$ and $Y_1$ have been shown), each connected to the output of an amplifier Z, respectively; solenoid $Y_0$ controls the printing of digit "nine" by the printing machine, whereas solenoids $Y_1$, $Y_2$ . . . $Y_9$ control the printing of the respective digits "eight," "seven" . . . "zero," respectively. As a matter of fact, in order to control printing, the control solenoids should be fed for a time (averaging 1/30 of a second) much longer than the duration of a state of the dekatron (which is one thousandth of a second, if S*a* and S*b* each introduce a delay of 0.5 millisecond and together a delay of one thousandth of a second) and this is why it is necessary to increase the duration of the state corresponding to the digit to be printed;

A univibrator S*r* (made, like univibrators S*a* and S*b*, with three PNP transistors 23, 24, 27, a capacitor 25 and a coupling line 26, the capacity of the capacitor 25 of S*r* being however much greater than that of the capacitor 25 of S*a* and S*b* in order to have a semistable state of longer duration); this univibrator S*r* introduces a delay of the order of 1/30 of a second in the case of a favorable answer, that is to say, of a digit to be printed; this univibrator S*r* is triggered by the "carry" pulses *y* between $W_1$ and $W_2$ (arriving through line 52*a*, coupling capacitor 52 and diode 53) and it delivers favorable answer signals S*r* of a duration sufficient to permit the printing of the digit to be transferred, pulse $s_2$ being sent through conductor 54 to the diode 34 of the or-circuit L*r* (the function of which has been indicated above);

An amplifier ZA, including two PNP transistors 55, 56, amplifying the signal *sr* collected at 57, and a gate ZB consisting of a NPN transistor 58 which is normally blocked but is made conducting by the output of ZA, this transistor being provided only in the emitter circuit of the transistor 50 of amplifier $Z_0$ (and not of amplifiers $Z_1$ to $Z_9$).

The operation of the device of FIGS. 15 to 17 is as follows:

Initially, dekatron A is in state "zero" and delivers signal $b_0$ to its line $M_0$.

However, this signal does not produce the feed of solenoid $Y_0$ through amplifier $Z_0$ due to the fact that the transistor 58 of gate ZB is normally blocked.

This application of the order *e* to print the contents of $W_1$ has for its effect, through E, to shift, first univibrator S*a* and, 0.5 millisecond later, univibrator S*b* from the stable state to the semistable state. The return of S*b* to its stable state, transmitted through the or-circuit L*r* is differentiated by differentating circuit U. The resulting pulse *r*, amplified in V and transformed into a pulse *a* of 60 volts, serves to trigger tube A which passes into state "one," so that a positive signal $b_1$ appears at cathode, or output, $C_1$. On the one hand, signal $b_1$ is reversed by transistor 18, differentiated by circuit 16—17 and the negative pulse resulting therefrom (corresponding to the leading edge of $b_1$) serves to make conducting (or saturating) transistor 19 (normally blocked) to deliver a positive pulse $c_1$ which, through the diode 21 of mixer E produces (in the same manner as pulse *e* above) a switching of dekatron A, which passes to state "two" after having remained one millisecond (duration of the total delay introduced by S*a* and S*b*) in state "one." On the other hand, signal $B_1$ is transmitted through line $M_1$ and amplified by $Z_1$ to be fed to solenoid $Y_1$, but normally this feed lasts only for one millisecond (duration of state "one") and therefore does not produce printing of the corresponding digit ("eight" in this case).

The series of operations above described for state "one" is repeated in state "two," with the exception that signal $b_2$ is reversed and differentiated by circuit K*b*, similar to circuit K*a*, and that this signal is fed to a solenoid $Y_2$ (not shown) also for 1 millisecond. The cycle goes on with an alternating operation of K*a* (for the odd numbered signals *b*) and of K*b* (for the even numbered signals *b*), the successive solenoidals Y being fed each during one millisecond.

At the same time, after every pulse *e* or *c* transmitted by mixer E, an interrogation pulse *x* is sent through line 30 to decade $W_1$ and produces an advance thereof of one unit on every millisecond.

These operations go on until a decade $W_1$ passes from position "nine" to position "zero," transmitting at the same time a "carry" pulse intended to act on the next decade $W_2$ when the decades are used for counting. On the contrary, during the transfer of the contents of the decade, the "carry" pulse is transmitted as pulse *y* to unit S*r* (a switching device, not shown, permits, according as the case may be, of transmitting the "carry" pulse either to $W_2$ or to S*r*). Univibrator S*r* passes, in response to pulse *y*, to its semistable state, where it remains for approximately 1/30 of a second, emitting a signal *sr* of this duration which overlaps (as explained with reference to FIGS. 13 and 14) the trailing edge of signal *s* in the or-circuit L*r*, so that the dekatron A is maintained in the state it occupies when emitting the "carry" pulse for a time of about 1/30 of a second. This results into the transmission of the corresponding signal *b* and consequently the feed of the corresponding solenoid Y for this period of time. This solenoid therefore causes the printing, by the printing machine, of the complement to nine of the digit of the solenoid. In view of the fact that if decade $W_1$ occupies the state corresponding to digit *p* (*p* ranging from 0 to 9 inclusive), the "carry" pulse will be produced after $9-p$ pulses received by S*a* from E, which will feed solenoid $Y_{9-p}$ which will cause digit *p* to be printed, this digit being the complement to nine of the index $9-p$ of this solenoid. It will therefore be seen that the device truly causes printing of the digit corresponding to the state of decade $W_1$.

At the end of signal *sr*, circuit U delivers a pulse *f* serving to produce a shifting of dekatron A to the next state, and the cycle goes on normally with a shifting on every millisecond until the dekatron comes back to its initial state "zero." Decade $W_1$, having received ten pulses *x*, also returns to its initial state. It will be noted that gate ZB, including transistor 58, serves to avoid a permanent energizing of solenoid $Y_0$ and therefore the printing of digit "nine" when switch A is at rest. On the contrary, if decade $W_1$ occupied state "nine" at the time of interrogation, it would transmit as soon as the first pulse *y* (corresponding to *e* delayed by 0.5 millisecond in S*a*) is received, a pulse *y* which would be transformed into a signal *sr* by univibrator S*r*. This signal, amplified in amplifier ZA, serves in this case to make transistor 58 conducting, thus causing the feed of $Y_0$ from $b_0$ during the duration of *sr*. The dekatron will therefore pass in this case from state "zero" to state "one" only after a time period equal to the sum of the delays introduced by S*a* and S*r*, after which it will remain for one millisecond in the other states successively to return to state "zero," but this time without having fed solenoid $Y_0$.

The printing of the contents of the other decades may take place in a manner analogous to the operation of the switching device of FIG. 16, by providing another switching device of the same kind between line 30 and line 52*a* on the one hand, and the different decades on the other hand. It is also possible to achieve the transfer of the contents of several counters by providing a third switching device of the same type, which successively selects the different counters. Owing to connections of the type illustrated by FIG. 9 between the three switches of the switching devices, it is possible automatically to produce, in response to a single order, the recording of the contents of the decades of several counters.

The switching device according to the present invention has many advantages.

It permits of automatically obtaining sequences of control signals at determined time intervals in response to a single order, that is to say to "program" a series of operations.

Breaks in the sequences are possible.

It permits of producing trains of pulses in any desired order, at determined intervals identical or different.

The safety of operation of the device, in particular concerning the number of pulses and the duration (easily adjustable) of the intervals is very great.

It is cheap to manufacture, by means of elements which are readily available.

The sequential switching device according to the invention may have various applications, in particular a commutation system, systems for controlling a series of successive operations according to a given program. The signals or voltages *b* which are successively available in line N may serve various purposes such as controlling, switching, programming, and so on. A particular example of application (transfer of the contents of a pulse counter) has been described in detailed fashion with reference to FIGS. 15, 16 and 17.

Of course, the electronic switch designated by A or $A^1$ may be of any suitable type. It may consist of a multi-cathode gas filled tube such as described in the United States Patent No. 2,898,513 to Townsend et al., such a tube being known under the name of "Trochotron."

The above described embodiments of the invention are of course to be considered as non-limitative examples thereof.

What I claim is:

1. A sequential switching device which comprises, in combination, at least one electronic switch having one input and more than two outputs, this switch having more than two distinct states, in each of which it delivers a signal to one of its outputs respectively, and being capable of passing, in response to a trigger pulse applied to its input, from one state to the next one while delivering a signal to the output corresponding to this new state; means connected with some of said switch outputs for producing, in response to signals delivered to said outputs, respective output pulses produced by the leading edges of said signals; a control unit capable of delivering starting pulses; a mixer having at least two inputs and an output, at least one of said mixer inputs being connected to said control element to receive starting pulses therefrom to start said switch operating and at least another one of said mixer inputs being connected to said means so that last mentioned mixer input receives said output pulses from said means and said mixer output being connected to said switch input, for transmitting thereto, as trigger pulses, both the starting pulses received at said mixer first input and the output pulses received at said mixer second input; and at least one delay unit connected so as to delay at least said output pulses.

2. A sequential switching device according to claim 1 wherein said electronic switch is a decimal counter tube.

3. A sequential switching device according to claim 1 wherein said electronic switch is a duodecimal counter tube.

4. A sequential switching device according to claim 1 wherein said electronic switch is a multi-cathode gas-filled tube of the trochotron type.

5. A sequential switching device according to claim 1 wherein said means connected to some of said switch outputs for producing output pulses comprise a plurality of differentiating circuits each having its input connected to one of said last mentioned switch outputs, respectively, and at least one or-circuit having its inputs connected with the outputs of at least some of the outputs of said differentiating circuits.

6. A sequential switching device according to claim 1 wherein said mixer consists of an or-circuit.

7. A sequential switching device according to claim 1 wherein said delay unit comprises at least one univibrator and a differentiating circuit.

8. A sequential switching device according to claim 1 wherein said at least one delay unit is connected to one input of said mixer to delay only said output pulses.

9. A sequential switching device according to claim 1 wherein there are several of said delay units, capable of producing different delays, respectively, said units having each one input connected to at least one output, respectively, of said means for producing output pulses and one output connected to the second mentioned input of said mixer.

10. A sequential switching device according to claim 1 wherein said at least one delay unit is connected to the input of said mixer to delay both said output pulses and said starting pulses.

11. A sequential switching device according to claim 1 comprising at least two electronic switches each with one input and more than two outputs and means for connecting the outputs of said switches to obtain a desired sequence.

12. A sequential switching device according to claim 1 further comprising, for sequence interruption, means for increasing the duration of a state of said electronic switch in response to a given signal.

13. A sequential switching device according to claim 1 wherein said delay unit comprises a first univibrator having an input connected to the output of said means for producing output pulses and an output and a differentiating circuit having an input and an output connected with said second input of said mixer, further comprising, for sequence interruption, means for increasing the duration of a state of said electronic switch in response to a given signal, said last mentioned means comprising a second multivibrator having an input adapted to receive said last mentioned signal and an output, and an or-circuit having two inputs and one output, said last mentioned output being connected with said differentiating circuit input, the outputs of said univibrators being connected with the inputs of said or-circuit, respectively.

No references cited.